(12) United States Patent  
Morris et al.

(10) Patent No.: US 10,107,319 B2  
(45) Date of Patent: Oct. 23, 2018

(54) ELASTICALLY AVERAGED ALIGNMENT SYSTEMS AND METHODS

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 749 days.

(21) Appl. No.: 14/635,431

(22) Filed: Mar. 2, 2015

(65) Prior Publication Data

US 2016/0257350 A1    Sep. 8, 2016

(51) Int. Cl.
   *F16B 5/06*   (2006.01)
   *B60R 13/02*  (2006.01)

(52) U.S. Cl.
   CPC ........ *F16B 5/0628* (2013.01); *B60R 13/0206* (2013.01)

(58) Field of Classification Search
   CPC .................. Y10T 403/75; Y10T 24/309; Y10T 24/44026; Y10T 24/45105; F16B 39/284; F16B 19/004; F16B 21/086; F16B 33/006; B60R 13/0206
   USPC ........................ 403/408.1; 411/508, 509, 510
   See application file for complete search history.

(56) References Cited

U.S. PATENT DOCUMENTS

| | | | |
|---|---|---|---|
| 2,385,180 A | 9/1945 | Allen |
| 2,560,530 A | 7/1951 | Burdick |
| 2,693,014 A | 11/1954 | Monahan |
| 2,958,230 A | 11/1960 | Haroldson |
| 3,152,376 A | 10/1964 | Boser |
| 3,551,963 A | 1/1971 | Long |
| 3,800,369 A | 4/1974 | Nikolits |
| 3,841,044 A | 10/1974 | Brown |
| 3,860,209 A | 1/1975 | Strecker |

(Continued)

FOREIGN PATENT DOCUMENTS

| | | |
|---|---|---|
| BE | 842302 A | 9/1976 |
| CN | 2285844 Y | 7/1998 |

(Continued)

OTHER PUBLICATIONS

Office Action regarding related CN App. No. 201610223626.8; dated Jan. 29, 2018; 9 pgs.

*Primary Examiner* — Amber R Anderson  
*Assistant Examiner* — Nahid Amiri  
(74) *Attorney, Agent, or Firm* — Cantor Colburn LLP

(57) ABSTRACT

An elastically averaged alignment system includes a threaded alignment member, a first component comprising a first inner wall defining a first alignment aperture, and a second component comprising a second inner wall defining a second alignment aperture. The first and second alignment apertures are configured to receive the threaded alignment member to couple the first component and the second component. The threaded alignment member is an elastically deformable material such that when the threaded alignment member is interferingly inserted into the first and second alignment apertures, the threaded alignment member elastically deforms to an elastically averaged final configuration to facilitate coupling and aligning the first component and the second component in a desired orientation.

18 Claims, 3 Drawing Sheets

(56) References Cited

U.S. PATENT DOCUMENTS

| | | |
|---|---|---|
| 3,897,967 A | 8/1975 | Barenyl |
| 3,988,808 A | 11/1976 | Poe et al. |
| 4,193,588 A | 3/1980 | Doneaux |
| 4,527,760 A | 7/1985 | Salacuse |
| 4,599,768 A | 7/1986 | Doyle |
| 4,854,797 A * | 8/1989 | Gourd .................. F16B 33/006 411/383 |
| 4,865,502 A | 9/1989 | Maresch |
| 4,878,792 A * | 11/1989 | Frano .................... B60N 3/046 24/615 |
| 5,005,265 A | 4/1991 | Muller |
| 5,039,267 A | 8/1991 | Wollar |
| 5,165,749 A | 11/1992 | Sheppard |
| 5,339,491 A | 8/1994 | Sims |
| 5,368,427 A | 11/1994 | Pfaffinger |
| 5,407,310 A | 4/1995 | Kassouni |
| 5,456,267 A * | 10/1995 | Stark .................... A61B 10/025 128/898 |
| 5,566,840 A | 10/1996 | Waldner |
| 5,593,265 A | 1/1997 | Kizer |
| 5,629,823 A | 5/1997 | Mizuta |
| 5,775,860 A | 7/1998 | Meyer |
| 5,797,714 A | 8/1998 | Oddenino |
| 5,934,729 A | 8/1999 | Baack |
| 6,079,083 A | 6/2000 | Akashi |
| 6,103,987 A | 8/2000 | Nordquist |
| 6,109,882 A | 8/2000 | Popov |
| 6,152,436 A | 11/2000 | Sonderegger et al. |
| 6,199,248 B1 | 3/2001 | Akashi |
| 6,254,304 B1 | 7/2001 | Takizawa et al. |
| 6,336,767 B1 | 1/2002 | Nordquist et al. |
| 6,351,380 B1 | 2/2002 | Curlee |
| 6,345,420 B1 | 12/2002 | Nabeshima |
| 6,523,229 B2 | 2/2003 | Severson |
| 6,637,095 B2 | 10/2003 | Stumpf et al. |
| 6,757,942 B2 | 7/2004 | Matsui |
| 6,821,091 B2 | 11/2004 | Lee |
| 7,055,785 B1 | 6/2006 | Diggle, III |
| 7,547,061 B2 | 6/2009 | Horimatsu |
| 7,591,573 B2 | 9/2009 | Maliar et al. |
| 7,614,836 B2 | 11/2009 | Mohiuddin |
| 7,727,667 B2 | 6/2010 | Sakurai |
| 8,228,640 B2 | 7/2012 | Woodhead et al. |
| 8,249,679 B2 | 8/2012 | Gui |
| 8,291,553 B2 | 10/2012 | Moberg |
| 8,312,887 B2 | 11/2012 | Dunn et al. |
| 8,572,818 B2 | 11/2013 | Hofmann |
| 8,371,788 B2 | 12/2013 | Lange |
| 8,619,504 B2 | 12/2013 | Wyssbrod |
| 8,746,801 B2 | 6/2014 | Nakata |
| 8,833,771 B2 | 9/2014 | Lesnau |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,061,403 B2 | 6/2015 | Colombo et al. |
| 9,062,991 B2 | 6/2015 | Kanagaraj |
| 2003/0059255 A1 | 3/2003 | Kirchen |
| 2004/0028503 A1 | 2/2004 | Charles |
| 2004/0262873 A1 | 12/2004 | Wolf et al. |
| 2005/0109489 A1 | 5/2005 | Kobayashi |
| 2006/0092653 A1 | 5/2006 | Tachiiwa et al. |
| 2006/0125286 A1 | 6/2006 | Horimatsu et al. |
| 2006/0163902 A1 | 7/2006 | Engel |
| 2006/0170242 A1 | 8/2006 | Forrester et al. |
| 2007/0137018 A1 | 6/2007 | Aigner et al. |
| 2007/0205627 A1 | 9/2007 | Ishiguro |
| 2007/0227942 A1 | 10/2007 | Hirano |
| 2007/0251055 A1 | 11/2007 | Gerner |
| 2007/0274777 A1 | 11/2007 | Winkler |
| 2007/0034636 A1 | 12/2007 | Fukuo |
| 2009/0093111 A1 | 4/2009 | Buchwalter et al. |
| 2009/0126168 A1 | 5/2009 | Kobe et al. |
| 2009/0243172 A1 | 10/2009 | Ting et al. |
| 2009/0309388 A1 | 12/2009 | Ellison |
| 2010/0232171 A1 | 9/2010 | Cannon |
| 2010/0263417 A1 | 10/2010 | Shoenow |
| 2010/0307848 A1 | 12/2010 | Hashimoto |
| 2011/0036542 A1 | 2/2011 | Woicke |
| 2011/0083392 A1 | 4/2011 | Timko |
| 2011/0103884 A1 | 5/2011 | Shiomoto et al. |
| 2011/0154645 A1 | 6/2011 | Morgan |
| 2011/0183152 A1 | 7/2011 | Lanham |
| 2012/0000291 A1 | 1/2012 | Christoph |
| 2012/0112489 A1 | 5/2012 | Okimoto |
| 2012/0301067 A1 | 11/2012 | Morgan |
| 2012/0311829 A1 | 12/2012 | Dickinson |
| 2013/0055822 A1 | 3/2013 | Frank |
| 2014/0264206 A1 | 9/2014 | Morris |
| 2015/0052725 A1 | 2/2015 | Morris et al. |
| 2015/0056009 A1 | 2/2015 | Morris |
| 2015/0063943 A1 | 3/2015 | Morris |
| 2015/0086265 A1 | 3/2015 | Morris |
| 2015/0093178 A1 | 4/2015 | Morris |
| 2015/0093179 A1 | 4/2015 | Morris et al. |
| 2015/0165609 A1 | 6/2015 | Morris et al. |
| 2015/0165985 A1 | 6/2015 | Morris |
| 2015/0166124 A1 | 6/2015 | Morris |
| 2015/0167717 A1 | 6/2015 | Morris |
| 2015/0174740 A1 | 6/2015 | Morris et al. |
| 2015/0175091 A1 | 6/2015 | Morris et al. |
| 2015/0176759 A1 | 6/2015 | Morris et al. |

FOREIGN PATENT DOCUMENTS

| | | |
|---|---|---|
| CN | 2679409 Y | 2/2005 |
| CN | 1933747 A | 3/2007 |
| CN | 1961157 A | 5/2007 |
| CN | 101930253 A | 12/2010 |
| CN | 201818606 U | 5/2011 |
| CN | 102235402 A | 11/2011 |
| CN | 202132326 U | 2/2012 |
| CN | 102803753 A | 11/2012 |
| CN | 102869891 A | 1/2013 |
| CN | 102939022 A | 2/2013 |
| CN | 202987018 U | 6/2013 |
| CN | 103201525 A | 7/2013 |
| CN | 104100611 A | 10/2014 |
| DE | 102008047464 A1 | 4/2010 |
| EP | 1243471 A2 | 9/2002 |
| EP | 1452745 A1 | 9/2004 |
| FR | 2942749 A1 | 9/2010 |
| FR | 2959785 A1 | 11/2011 |
| JP | 2000010514 A | 1/2000 |
| JP | 2001141154 A | 5/2001 |
| JP | 2011501069 A | 1/2011 |
| JP | 2011085174 A | 4/2011 |
| JP | 2012060791 A | 3/2012 |
| JP | 2012112533 A | 6/2012 |
| KR | 20030000251 A1 | 1/2003 |
| WO | 9602963 A1 | 2/1996 |
| WO | 0055517 A2 | 3/2000 |
| WO | 2001032454 A3 | 11/2001 |
| WO | 2004010011 | 1/2004 |
| WO | 2010105354 A1 | 9/2010 |
| WO | 2011025606 | 3/2011 |
| WO | 2013088447 A1 | 6/2013 |

* cited by examiner

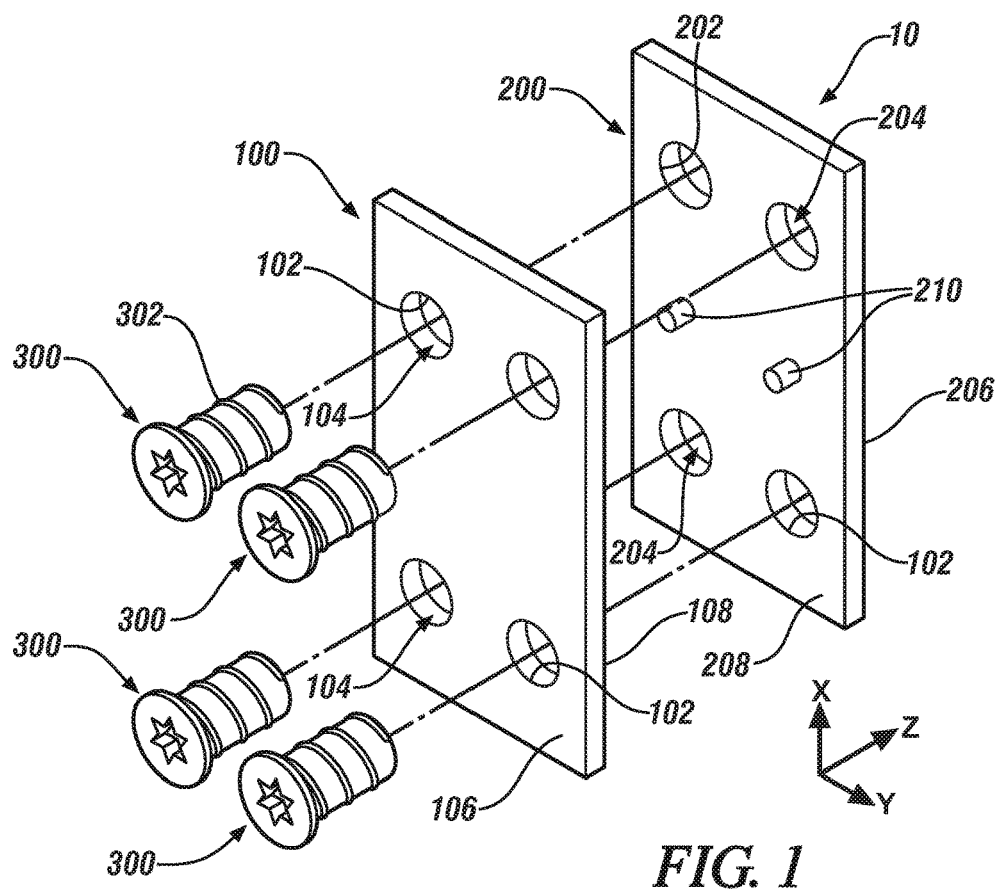
FIG. 1
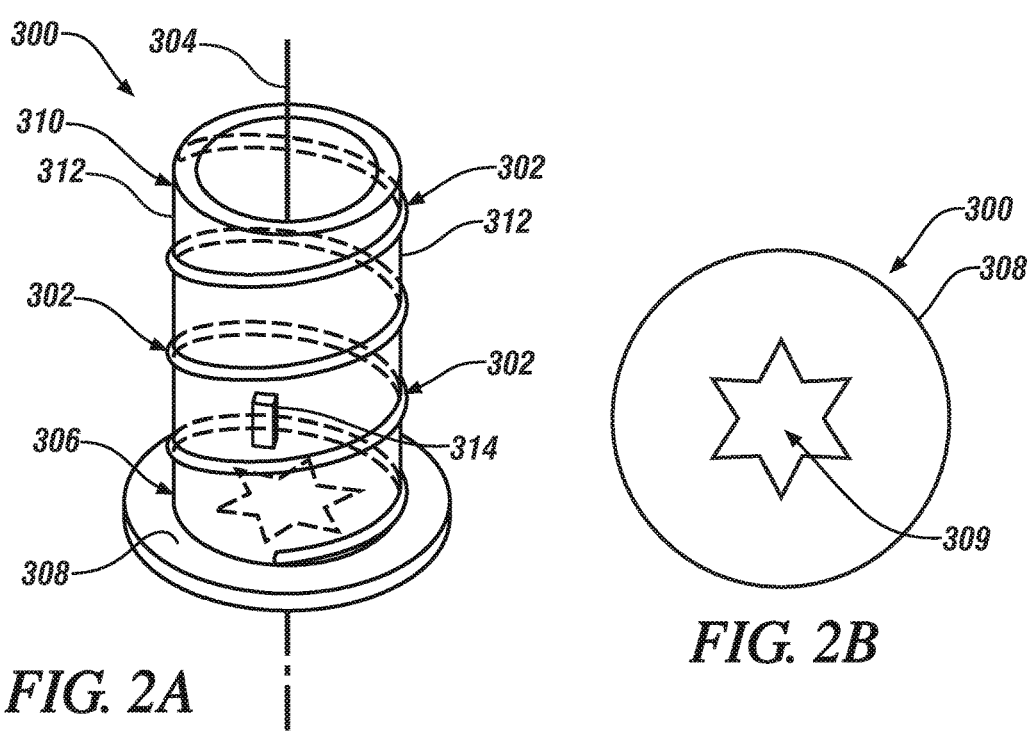
FIG. 2A
FIG. 2B

ELASTICALLY AVERAGED ALIGNMENT SYSTEMS AND METHODS

FIELD OF THE INVENTION

The subject invention relates to matable components and, more specifically, to elastically averaged matable components for alignment and retention.

BACKGROUND

Components, in particular vehicular components used in automotive vehicles, which are to be mated together in a manufacturing process may be mutually located with respect to each other by alignment features that are oversized holes and/or undersized upstanding bosses. Such alignment features are typically sized to provide spacing to freely move the components relative to one another to align them without creating an interference therebetween that would hinder the manufacturing process. One such example includes two-way and/or four-way male alignment features; typically upstanding bosses, which are received into corresponding female alignment features, typically apertures in the form of slots or holes. The components are formed with a predetermined clearance between the male alignment features and their respective female alignment features to match anticipated size and positional variation tolerances of the male and female alignment features that result from manufacturing (or fabrication) variances.

As a result, significant positional variation can occur between two mated components having the aforementioned alignment features, which may contribute to the presence of undesirably large variations in their alignment, particularly with regard to gaps and/or spacing therebetween. In the case where misaligned components are also part of another assembly, such misalignment may also affect the function and/or aesthetic appearance of the entire assembly. Regardless of whether such misalignment is limited to two components or an entire assembly, it can negatively affect function and result in a perception of poor quality. Moreover, clearance between misaligned components may lead to relative motion therebetween, which may cause undesirable noise such as squeaking and rattling, and further result in the perception of poor quality.

SUMMARY OF THE INVENTION

In one aspect, an elastically averaged alignment system is provided. The alignment system includes an elastically averaged alignment system comprising a threaded alignment member, a first component comprising a first inner wall defining a first alignment aperture, and a second component comprising a second inner wall defining a second alignment aperture. The first and second alignment apertures are configured to receive the threaded alignment member to couple the first component and the second component. The threaded alignment member is an elastically deformable material such that when the threaded alignment member is interferingly inserted into the first and second alignment apertures, the threaded alignment member elastically deforms to an elastically averaged final configuration to facilitate coupling and aligning the first component and the second component in a desired orientation.

In another aspect, a vehicle is provided. The vehicle includes a body and an elastically averaged alignment system integrally arranged with the body. The elastically averaged alignment system includes a threaded alignment member, a first component comprising a first inner wall defining a first alignment aperture, and a second component comprising a second inner wall defining a second alignment aperture. The first and second alignment apertures are configured to receive the threaded alignment member to couple the first component and the second component. The threaded alignment member is an elastically deformable material such that when the threaded alignment member is interferingly inserted into the first and second alignment apertures, the threaded alignment member elastically deforms to an elastically averaged final configuration to facilitate coupling and aligning the first component and the second component in a desired orientation.

In yet another aspect, a method of manufacturing an elastically averaged alignment system is provided. The method includes forming a threaded alignment member, forming a first component comprising a first inner wall defining a first alignment aperture, and forming a second component comprising a second inner wall defining a second alignment aperture. The first and second alignment apertures are configured to receive the threaded alignment member to couple the first component and the second component. The threaded alignment member is an elastically deformable material such that when the threaded alignment member is interferingly inserted into the first and second alignment apertures, the threaded alignment member elastically deforms to an elastically averaged final configuration to facilitate coupling and aligning the first component and the second component in a desired orientation.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1 is a perspective view of an exemplary elastically averaged alignment system before assembly;

FIG. 2A is a side view of an exemplary threaded alignment member of the system shown in FIG. 1;

FIG. 2B is a bottom view of the alignment member shown in FIG. 2A;

DETAILED DESCRIPTION

Figure 3:
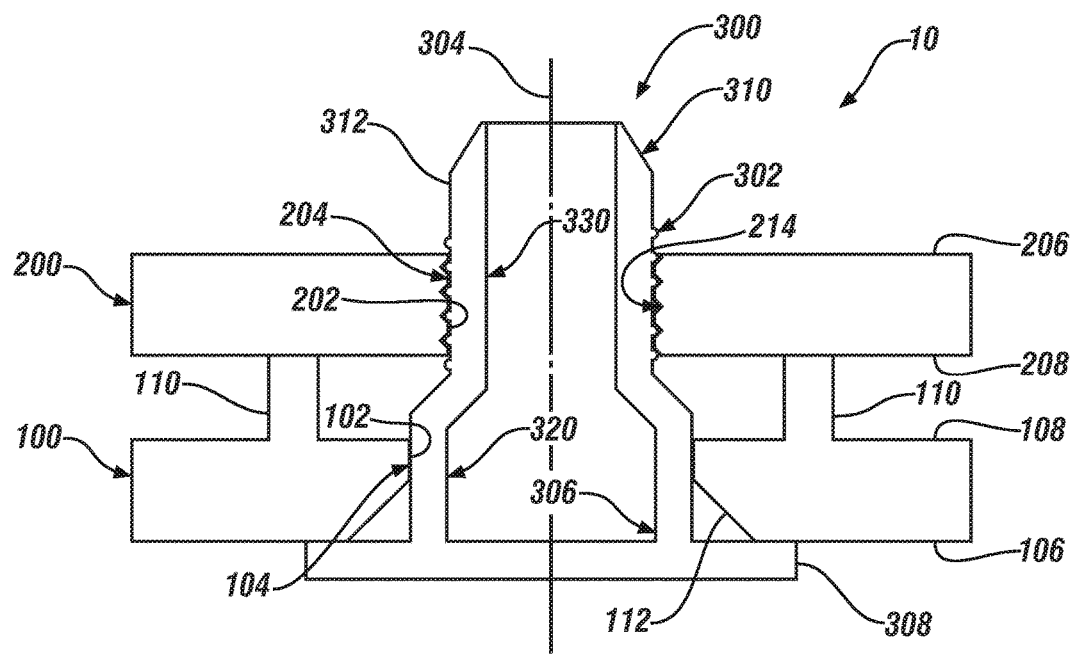
FIG. 3 is a cross-sectional view of another exemplary elastically averaged alignment system after assembly.

The following description is merely exemplary in nature and is not intended to limit the present disclosure, its application or uses. For example, the embodiments shown are applicable to vehicle body panels, but the alignment system disclosed herein may be used with any suitable components to provide elastic averaging for precision location and alignment of all manner of mating components and component applications, including many industrial, consumer product (e.g., consumer electronics, various appliances and the like), transportation, energy and aerospace applications, and particularly including many other types of vehicular components and applications, such as various interior, exterior and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to the application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. In some embodiments, the elastically deformable component configured to have the eat least one feature and associated mating feature disclosed herein may require more than one of such features, depending on the requirements of a particular embodiment. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component. The principles of elastic averaging are described in detail in commonly owned U.S. Pat. No. 8,695,201, the disclosure of which is incorporated by reference herein in its entirety. The embodiments disclosed above provide the ability to convert an existing component that is not compatible with the above-described elastic averaging principles, or that would be further aided with the inclusion of a four-way elastic averaging system as herein disclosed, to an assembly that does facilitate elastic averaging and the benefits associated therewith.

Any suitable elastically deformable material may be used for the mating components and alignment features disclosed herein and discussed further below, particularly those materials that are elastically deformable when formed into the features described herein. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

FIGS. 1-6 illustrate an exemplary elastically averaged alignment system 10 that generally includes a first component 100 to be mated to a second component 200 and retained in mated engagement by one or more elastically deformable fastening alignment members 300 having threads 302. First component 100 includes an inner wall 102 defining an alignment aperture 104, and second component 200 includes an inner wall 202 defining an alignment aperture 204. Alignment apertures 104, 204 are fixedly disposed on or formed integrally with their respective component 100, 200 for alignment and orientation when components 100 and 200 are mated. Components 100 and 200 may have any number and combination of corresponding alignment apertures 104, 204. Elastically deformable alignment member 300 is configured and disposed to interferingly, deformably, and matingly engage alignment aperture inner walls 102, 202, as discussed herein in more detail, to precisely align first component 100 with second component 200 in two or four directions, such as the +/−x-direction and the +/−y-direction of an orthogonal coordinate system, for example, which is herein referred to as two-way and four-way alignment. Moreover, elastically deformable alignment member 300 matingly engages alignment apertures 104, 204 to facilitate a stiff and rigid connection between first component 100 and second component 200, thereby reducing or preventing relative movement therebetween.

In an exemplary embodiment, first component 100 generally includes an outer face 106 and an inner face 108. First component 100 may optionally include one or more stand-offs 110 (e.g., FIG. 3) for engaging and supporting second component 200 in a spaced relation. In an exemplary embodiment, alignment aperture 104 is illustrated as having a generally circular cross-section. Alternatively, alignment aperture 104 may have any shape that enables system 10 to function as described herein. For example, alignment aperture 104 may be an elongated slot (e.g., similar to the shape of elastic tube alignment system described in co-owned U.S. Pat. No. 8,695,201 and particularly illustrated in FIG. 13 of the same). In the exemplary embodiment, first component 100 is fabricated from a rigid material such as plastic. However, first component 100 may be fabricated from any suitable material that enables system 10 to function as described herein.

Second component 200 generally includes an outer face 206 and an inner face 208. Second component 200 may optionally include one or more stand-offs 210 (e.g., FIG. 4) for engaging and supporting first component 100 in a spaced relation. In an exemplary embodiment, alignment aperture 204 is illustrated as having a generally circular cross-section. Alternatively, alignment aperture 204 may have any shape that enables system 10 to function as described herein. For example, alignment aperture 204 may be an elongated slot. In the exemplary embodiment, second component 200 is fabricated from a rigid material such as sheet metal. However, second component 200 may be fabricated from any suitable material that enables system 10 to function as described herein.

While not being limited to any particular structure, first component 100 may be a door trim component of a vehicle with the customer-visible side being outer face 106 and the holes may be in pocketed areas of the trim such as behind door handles or in an armrest (not shown). The second component 200 may be a supporting substructure that is part of, or is attached to, the vehicle and on which first component 100 is fixedly mounted in precise alignment. Alternatively, first component 100 may be an intermediate component located between second component support substructure 200 and a decorative trim component such as a vehicle grille (not shown).

With reference to FIG. 2, fastening alignment member 300 is a generally circular hollow tube having a central axis 304, a proximal end 306 coupled to a tool head 308, and a distal end 310. However, alignment member 300 may have any cross-sectional shape that enables system 10 to function as described herein. Fastening alignment member 300 includes an outer surface 312 having threading 302, which enables fastening alignment member 300 to be screwed into alignment apertures 104, 204 to couple components 100, 200. Tool head 308 includes a pattern 309 (FIG. 2B) that enables a tool to turn and drive (e.g., screw in) alignment member 300 such as, for example, a star drive, a hexagonal drive, and the like. In the exemplary embodiment, fastening alignment member 300 is fabricated from a material such as plastic. However, fastening alignment member 300 may be fabricated from any suitable material that enables system 10 to function as described herein.

To provide an arrangement where elastically deformable fastening alignment member 300 is configured and disposed to interferingly, deformably and matingly engage alignment aperture inner walls 102, 202, the diameter or cross-section of alignment apertures 104, 204 are less than or smaller than the diameter or cross-section of alignment member 300, which necessarily creates a purposeful interference fit between the elastically deformable fastening alignment member 300 and alignment aperture inner walls 102, 202. In some embodiments, fastening alignment member 300 may include a first diameter or cross-section portion 320 that is larger than a second diameter or cross-section portion 330 (see FIGS. 3 and 5). In such, embodiments, only one portion (e.g., 330) may include threading 302. Further, first and second components 100, 200 may include a chamfer 112, 212 (FIGS. 3-6) to facilitate insertion of fastening alignment member 300.

As such, when inserted into alignment apertures 104, 204, portions of the elastically deformable fastening alignment member 300 elastically deform to an elastically averaged final configuration that aligns alignment member 300 with the alignment apertures 104, 204 in four planar orthogonal directions (the +/−x-direction and the +/−y-direction). Where alignment apertures 104, 204 are elongated slots (not shown), fastening alignment member 300 is aligned in two planar orthogonal directions (the +/−x-direction or the +/−y-direction). Further, components 100, 200 may include additional elastically averaging features such as hollow tubes and corresponding apertures (not shown) to align components 100, 200 along with fastening alignment member 300.

Figure 4:
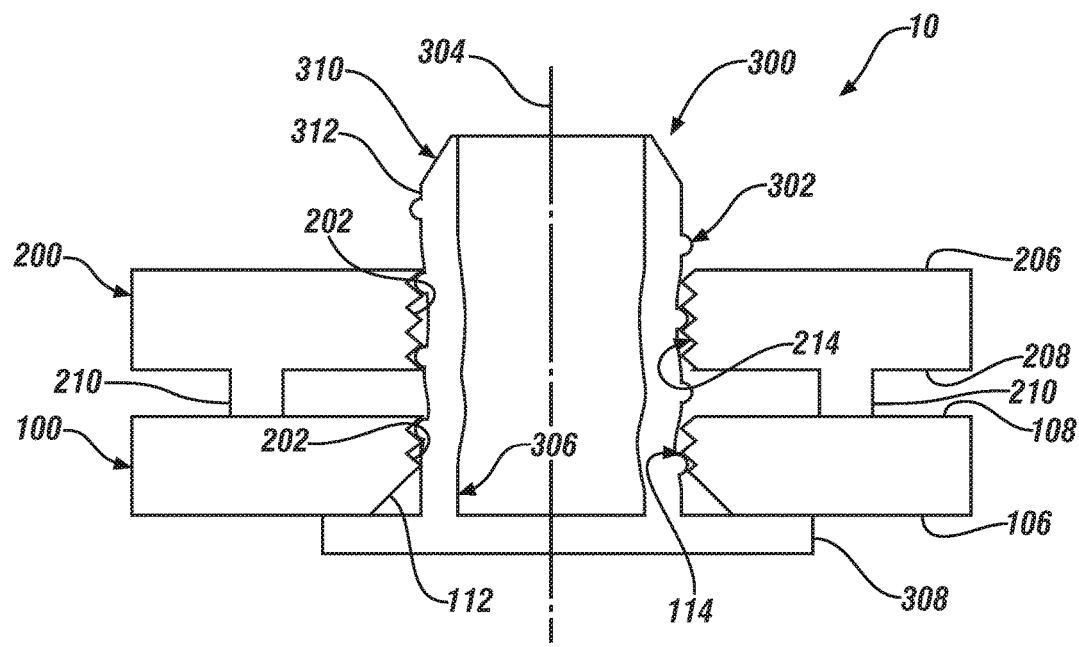
FIG. 4 is a cross-sectional view of yet another exemplary elastically averaged alignment system after assembly.
Figure 5:
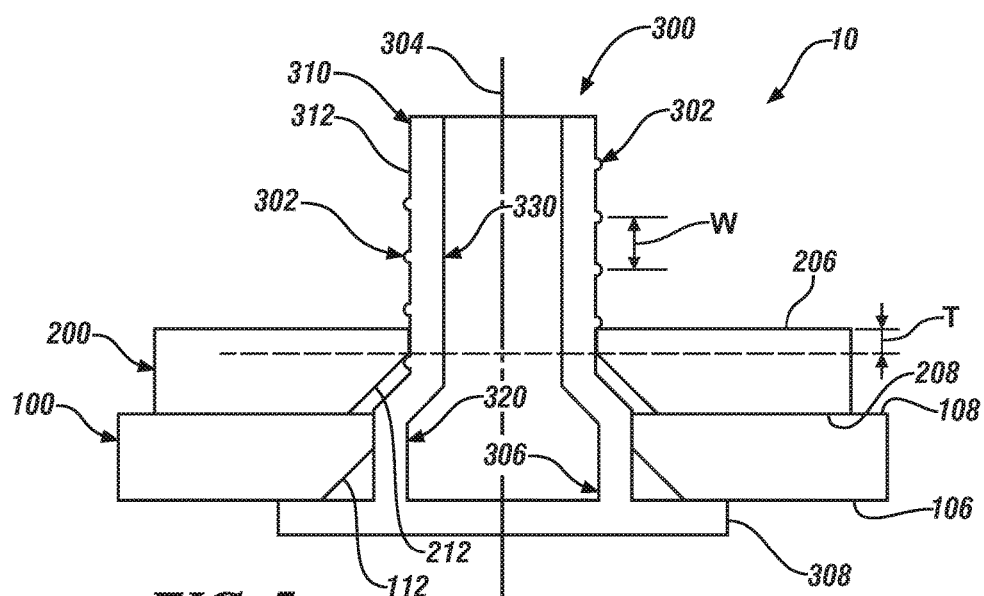
FIG. 5 is a cross-sectional view of yet another exemplary elastically averaged alignment system after assembly.
Figure 6:
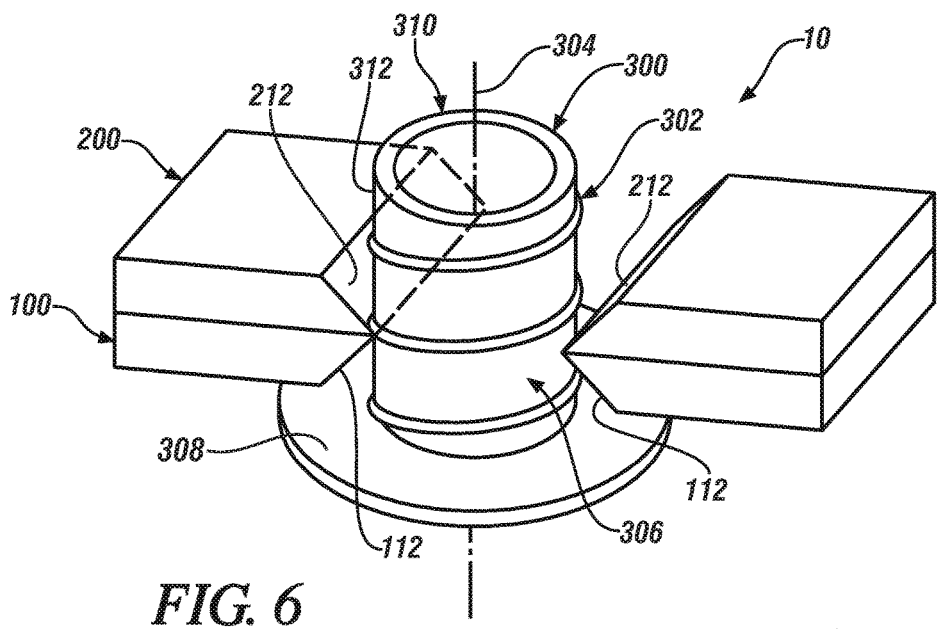
FIG. 6 is a cross-sectional view of yet another exemplary elastically averaged alignment system after assembly.

Fastening alignment member 300 includes threading 302 that facilitates retention of fastening alignment member 300 within alignment apertures 104, 204 in the +/−z direction. Further, as shown in FIGS. 3 and 4, inner wall 102 and/or 202 may include respective threading 114, 214 to engage threading 302. In other embodiments, such as shown in FIGS. 5 and 6, threading 302 may have a thread width 'W' that is greater than or equal to a thickness 'T' of component 100 or 200 to secure components 100, 200. In some embodiments, illustrated in FIG. 2, threading 302 may include a stop 314 to set a predetermined depth that alignment member 300 extends into alignment apertures 104 and/or 204.

In alternate embodiments, fastening alignment member 300 may be formed integrally with component 100, 200. For example, fastening alignment member 300 may be formed integrally with component 100 such that proximal end 306 is coupled to inner face 108. As such, rather than having an alignment aperture 104, first component 100 may be coupled to second component 200 by inserting fastening alignment member 300 into alignment aperture 204 and rotating component 100 to screw alignment member 300 into second component 200.

Figure 7:
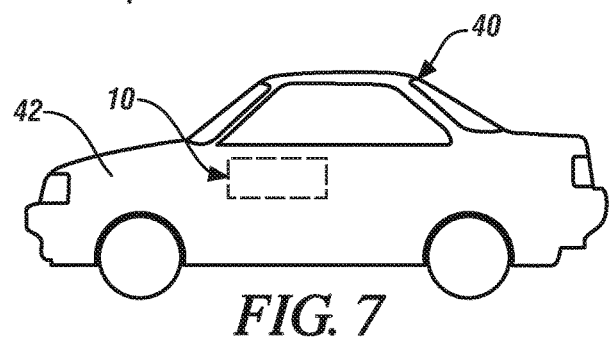
FIG. 7 is a side view of an exemplary vehicle that may utilize the elastically averaged alignment system shown in FIGS. 1-6.

In view of the foregoing, and with reference now to FIG. 7, it will be appreciated that an embodiment of the invention also includes a vehicle 40 having a body 42 with an elastically averaging alignment system 10 as herein disclosed integrally arranged with the body 42. In the embodiment of FIG. 7, the elastically averaging alignment system 10 is depicted forming at least a portion of the vehicle door trim of the vehicle 40. However, it is contemplated that an elastically averaging alignment system 10 as herein disclosed may be utilized with other structural features of the vehicle 40, such as interior trim and non-visible components like electrical module housings, instrument panel retainers, and console structure.

An exemplary method of fabricating elastically averaged alignment system 10 includes forming first component 100 with at least one inner wall 102 defining alignment aperture 104, and forming second component 200 with at least one inner wall 202 defining alignment aperture 204. At least one fastening alignment member 300 is formed to be elastically deformable such that when alignment member 300 is inserted into alignment apertures 104, 204, at least one of alignment member 300 and inner walls 102, 202 elastically deform to an elastically averaged final configuration to facilitate aligning first component 100 and second component 200 in a desired orientation.

Threading 302 is formed on fastening alignment member 300 to facilitate engagement and interference between alignment member 300 and components 100 and/or 200. Fastening alignment member 300 may be formed with a generally circular tubular body. Further, inner walls 102, 202 may be formed with threading 114, 214. Alternatively, or additionally, at least a portion of inner walls 102, 202 may be formed from an elastically deformable material that elastically deforms during insertion of alignment member 300.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An elastically averaged alignment system comprising:
   a threaded alignment member;
   a first component comprising a first inner wall defining a first alignment aperture having a first aperture cross-sectional dimension; and
   a second component comprising a second inner wall defining a second alignment aperture having a second aperture cross-sectional dimension, the first and second alignment apertures configured to receive the threaded alignment member to couple the first component and the second component,
   the alignment member having a cross-sectional dimension that is greater than the first aperture cross-sectional dimension and the second aperture cross-sectional dimension,
   wherein the threaded alignment member is an elastically deformable material such that when the threaded alignment member is interferingly inserted into the first and second alignment apertures, the threaded alignment member elastically deforms to an elastically averaged final configuration to facilitate coupling and aligning the first component and the second component in a desired orientation.

2. The alignment system of claim 1, wherein the threaded alignment member includes a tool head configured to receive a tool to facilitate screwing the threaded alignment member into the first and second component alignment apertures.

3. The alignment system of claim 1, wherein the threaded alignment member includes a stop configured to facilitate preventing further insertion of threaded alignment member into the first and second component alignment apertures such that the threaded alignment member is inserted into the first and second component alignment apertures to a desired depth.

4. The alignment system of claim 1, wherein the threaded alignment member is tubular.

5. The alignment system of claim 4, wherein the tubular threaded alignment member has a first portion having a first diameter and a second portion having a second diameter greater than the first diameter, and wherein the first portion is disposed in the first alignment aperture and the second portion is disposed in the second alignment aperture.

6. The alignment system of claim 5, wherein only the first portion is threaded.

7. The alignment system of claim 1, wherein at least one of the first inner wall and the second inner wall is threaded.

8. The alignment system of claim 1, further comprising a plurality of elastically deformable threaded alignment member, the first component comprising a plurality of first alignment apertures, and the second component comprising a plurality of second alignment apertures, the plurality of elastically deformable threaded alignment members being geometrically distributed with respect to respective first and second alignment apertures, such that portions of the elastically deformable threaded alignment member of elastically deformable threaded alignment members, when engaged with respective first and second alignment apertures, elastically deform to an elastically averaged final configuration that further aligns the first component and the second component in at least two or four planar orthogonal directions.

9. A vehicle comprising:
   a body; and
   an elastically averaged alignment system integrally arranged within the body, the elastically averaged alignment system comprising:
     a threaded alignment member, the threaded alignment member being a tubular member with a central aperture;
     a first component comprising a first inner wall defining a first alignment aperture; and
     a second component comprising a second inner wall defining a second alignment aperture, the first and second alignment apertures configured to receive the threaded alignment member to couple the first component and the second component,
     wherein the threaded alignment member is an elastically deformable material such that when the threaded alignment member is interferingly inserted into the first and second alignment apertures, the threaded alignment member elastically deforms to an elastically averaged final configuration to facilitate coupling and aligning the first component and the second component in a desired orientation.

10. The vehicle of claim 9, wherein the threaded alignment member includes a tool head configured to receive a tool to facilitate screwing the threaded alignment member into the first and second component alignment apertures.

11. The vehicle of claim 9, wherein the threaded alignment member includes a stop configured to facilitate preventing further insertion of threaded alignment member into the first and second component alignment apertures such that the threaded alignment member is inserted into the first and second component alignment apertures to a desired depth.

12. The vehicle of claim 9, wherein the tubular threaded alignment member had a first portion having a first diameter and a second portion having a second diameter greater than the first diameter, and wherein the first portion is disposed in the first alignment aperture and the second portion is disposed in the second alignment aperture.

13. The vehicle of claim 12, wherein only the first portion is threaded.

14. The vehicle of claim 9, wherein at least one of the first inner wall and the second inner wall is threaded.

15. The vehicle of claim 9, further comprising a plurality of elastically deformable threaded alignment member, the first component comprising a plurality of first alignment apertures, and the second component comprising a plurality of second alignment apertures, the elastically deformable threaded alignment members being geometrically distributed with respect to respective first and second alignment apertures, such that portions of the elastically deformable threaded alignment member of respective elastically deformable threaded alignment members, when engaged with respective first and second alignment apertures, elastically deform to an elastically averaged final configuration that further aligns the first component and the second component in at least two or four planar orthogonal directions.

16. A method of manufacturing an elastically averaged alignment system, the method comprising:
  forming a threaded alignment member as a tubular member having a central aperture;
  forming a first component comprising a first inner wall defining a first alignment aperture; and
  forming a second component comprising a second inner wall defining a second alignment aperture, the first and second alignment apertures configured to receive the threaded alignment member to couple the first component and the second component,
  wherein the threaded alignment member is an elastically deformable material such that when the threaded alignment member is interferingly inserted into the first and second alignment apertures, the threaded alignment member elastically deforms to an elastically averaged final configuration to facilitate coupling and aligning the first component and the second component in a desired orientation.

17. The method of claim 16, further comprising forming the threaded alignment member with a tool head configured to receive a tool to facilitate screwing the threaded alignment member into the first and second alignment aperture.

18. The method of claim 16, further comprising forming the threaded alignment member with a first portion having a first diameter and a second portion having a second diameter greater than the first diameter.

* * * * *